(12) United States Patent
Seo et al.

(10) Patent No.: US 9,978,056 B2
(45) Date of Patent: May 22, 2018

(54) SMART CARD HAVING MULTIPLE PAYMENT INSTRUMENTS

(71) Applicant: KT CORPORATION, Gyeonggi-do (KR)

(72) Inventors: Myoung-Hee Seo, Seoul (KR);
Youn-Pil Jeung, Gyeonggi-do (KR);
Sung-Chul Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days. days.

(21) Appl. No.: 14/180,767

(22) Filed: Feb. 14, 2014

(65) Prior Publication Data

US 2014/0229372 A1   Aug. 14, 2014

(30) Foreign Application Priority Data

Feb. 14, 2013   (KR) .................. 10-2013-0015994

(51) Int. Cl.
*G06Q 20/34*   (2012.01)
*G06Q 20/22*   (2012.01)

(52) U.S. Cl.
CPC ......... *G06Q 20/341* (2013.01); *G06Q 20/227* (2013.01); *G06Q 20/3572* (2013.01)

(58) Field of Classification Search
CPC ........ G06Q 10/00; G06Q 20/00; G06Q 30/00; G06Q 40/00
USPC ................................. 705/3–44; 235/379–380
See application file for complete search history.

(56) References Cited

U.S. PATENT DOCUMENTS

| | | | |
|---|---|---|---|
| 6,016,476 A | 1/2000 | Maes et al. | |
| 6,925,439 B1* | 8/2005 | Pitroda | .................... 705/1.1 |
| 7,375,616 B2 | 5/2008 | Rowse et al. | |
| 7,395,241 B1* | 7/2008 | Cook et al. | .................... 705/39 |
| 7,478,054 B1 | 1/2009 | Adams et al. | |
| 7,562,818 B1 | 7/2009 | Bierbaum et al. | |
| 7,793,845 B2* | 9/2010 | Bonalle | ........... G06Q 20/105 235/379 |
| 8,016,191 B2* | 9/2011 | Bonalle | ........... G06Q 20/105 235/379 |
| 8,082,349 B1* | 12/2011 | Bhargava et al. | ........... 709/227 |
| 8,102,797 B2 | 1/2012 | Abel | |
| 8,121,945 B2* | 2/2012 | Rackley et al. | ........... 705/40 |
| 8,332,272 B2 | 12/2012 | Fisher | |
| 8,393,545 B1* | 3/2013 | Mullen | ........... G06Q 20/341 235/487 |

(Continued)

FOREIGN PATENT DOCUMENTS

EP   0949595 A2   10/1999
JP   2002-207970 A   7/2002

(Continued)

OTHER PUBLICATIONS

NFC Forum, "Type 4 Tag Operation Specification", Version 2.0, Jun. 28, 2011.

(Continued)

*Primary Examiner* — Frantzy Poinvil
(74) *Attorney, Agent, or Firm* — IP Legal Services, LLC

(57) ABSTRACT

The disclosure is related to a primary payment instrument of a smart card may be changed to one of other payment instruments stored in the smart card through single operation of user equipment without requiring further user input or user interaction.

20 Claims, 3 Drawing Sheets

(56) References Cited

U.S. PATENT DOCUMENTS

| | | | |
|---|---|---|---|
| 8,429,047 B2* | 4/2013 | Hurst | G06Q 20/045 455/406 |
| 8,554,653 B2* | 10/2013 | Falkenborg | G06Q 30/0255 705/35 |
| 8,744,906 B2* | 6/2014 | Fordyce, III | G06Q 20/10 705/14.1 |
| 8,788,418 B2* | 7/2014 | Spodak et al. | 705/41 |
| 8,818,851 B2 | 8/2014 | Lee et al. | |
| 8,876,011 B2* | 11/2014 | Olson | G06K 19/06206 235/487 |
| 9,607,192 B2 | 3/2017 | Corda | |
| 2001/0037254 A1 | 11/2001 | Glikman | |
| 2002/0042743 A1 | 4/2002 | Ortiz et al. | |
| 2002/0139843 A1 | 10/2002 | Park et al. | |
| 2004/0238620 A1 | 12/2004 | Cohagan et al. | |
| 2007/0138302 A1 | 6/2007 | Antoniou | |
| 2007/0179885 A1* | 8/2007 | Bird et al. | 705/39 |
| 2008/0099556 A1 | 5/2008 | Park | |
| 2008/0210751 A1* | 9/2008 | Kim | 235/379 |
| 2008/0228567 A1 | 9/2008 | Williams et al. | |
| 2008/0228586 A1 | 9/2008 | Stoffelsma et al. | |
| 2008/0233880 A1 | 9/2008 | Rofougaran et al. | |
| 2008/0255962 A1 | 10/2008 | Chang et al. | |
| 2008/0306849 A1 | 12/2008 | Johnson, Jr. et al. | |
| 2009/0006218 A1 | 1/2009 | Ku et al. | |
| 2009/0143104 A1 | 6/2009 | Loh et al. | |
| 2009/0144164 A1 | 6/2009 | Wane et al. | |
| 2009/0247078 A1 | 10/2009 | Sklovsky et al. | |
| 2009/0256731 A1 | 10/2009 | Matsuo et al. | |
| 2010/0030636 A1 | 2/2010 | Vijayshankar et al. | |
| 2010/0078471 A1 | 4/2010 | Lin et al. | |
| 2010/0078472 A1 | 4/2010 | Lin et al. | |
| 2010/0082481 A1 | 4/2010 | Lin et al. | |
| 2010/0153279 A1 | 6/2010 | Zahn | |
| 2010/0211504 A1 | 8/2010 | Aabye et al. | |
| 2010/0223111 A1 | 9/2010 | Maekawa | |
| 2010/0299527 A1 | 11/2010 | Arunan et al. | |
| 2010/0306080 A1 | 12/2010 | Trandal et al. | |
| 2011/0016275 A1 | 1/2011 | Lemonnier et al. | |
| 2011/0137994 A1 | 6/2011 | Kumar et al. | |
| 2011/0184857 A1* | 7/2011 | Shakkarwar | G06Q 20/10 705/39 |
| 2012/0022945 A1* | 1/2012 | Falkenborg | G06Q 30/0255 705/14.53 |
| 2012/0059702 A1* | 3/2012 | Yoder | G06Q 30/02 705/14.17 |
| 2012/0109764 A1* | 5/2012 | Martin | G06Q 20/204 705/17 |
| 2012/0150601 A1 | 6/2012 | Fisher | |
| 2012/0191612 A1 | 7/2012 | Spodak et al. | |
| 2012/0203697 A1 | 8/2012 | Morgan et al. | |
| 2012/0203701 A1 | 8/2012 | Ayuso de Paul | |
| 2012/0253970 A1 | 10/2012 | Ku et al. | |
| 2013/0060708 A1* | 3/2013 | Oskolkov et al. | 705/75 |
| 2013/0086375 A1 | 4/2013 | Lyne et al. | |
| 2013/0124349 A1* | 5/2013 | Khan | G06Q 20/36 705/21 |
| 2013/0159186 A1 | 6/2013 | Brudnicki et al. | |
| 2013/0238492 A1* | 9/2013 | Muthu et al. | 705/39 |
| 2013/0290184 A1* | 10/2013 | Shapiro | G06Q 20/405 705/44 |
| 2013/0304561 A1 | 11/2013 | Warner et al. | |
| 2013/0317924 A1 | 11/2013 | Bush et al. | |
| 2013/0332356 A1 | 12/2013 | Park et al. | |
| 2014/0074575 A1* | 3/2014 | Rappoport | G06Q 30/0222 705/14.17 |
| 2014/0129308 A1* | 5/2014 | Rappoport | G06Q 30/0215 705/14.17 |
| 2014/0136417 A1 | 5/2014 | Spodak et al. | |
| 2014/0249904 A1* | 9/2014 | Nelsen | G06Q 20/351 705/14.23 |
| 2014/0351048 A1* | 11/2014 | Fordyce | G06Q 20/10 705/14.53 |
| 2016/0335619 A1 | 11/2016 | Ce | |

FOREIGN PATENT DOCUMENTS

| | | |
|---|---|---|
| JP | 2003-281437 A | 10/2003 |
| JP | 2008-065669 A | 3/2008 |
| JP | 2011-096021 A | 5/2011 |
| KR | 10-2001-0022217 A | 3/2001 |
| KR | 10-2002-0076406 A | 10/2002 |
| KR | 10-2004-0028110 A | 4/2004 |
| KR | 10-2004-0060249 A | 7/2004 |
| KR | 10-2005-0047154 A | 5/2005 |
| KR | 10-2005-0112484 A | 11/2005 |
| KR | 10-2007-0006503 A | 1/2007 |
| KR | 10-2007-0051519 A | 5/2007 |
| KR | 10-2008-0020153 A | 3/2008 |
| KR | 10-0823679 B1 | 4/2008 |
| KR | 10-2009-0039894 A | 4/2009 |
| KR | 10-2009-0041398 A | 4/2009 |
| KR | 10-2009-0054824 A | 6/2009 |
| KR | 10-2010-0072115 A | 6/2010 |
| KR | 10-2011-0031046 A | 3/2011 |
| KR | 10-2011-0051739 A | 5/2011 |
| KR | 10-2011-0056561 A | 5/2011 |
| KR | 10-2011-0082888 A | 7/2011 |
| KR | 10-2011-0089697 A | 8/2011 |
| KR | 10-2011-0112594 A | 10/2011 |
| KR | 10-2011-0115264 A | 10/2011 |
| KR | 10-2011-0125848 A | 11/2011 |
| KR | 10-2012-0002136 A | 1/2012 |
| KR | 10-2012-0064206 A | 6/2012 |
| KR | 10-1168272 B1 | 8/2012 |
| KR | 10-2012-0097157 A | 9/2012 |
| KR | 10-2012-0098978 A | 9/2012 |
| KR | 10-1265574 B1 | 5/2013 |
| WO | 2010/039337 A2 | 4/2010 |

OTHER PUBLICATIONS

Wikipedia, "Graphical user interface", https://en.wikipedia.org/wiki/Graphical_user_interface, Dec. 1, 2005.

* cited by examiner

SMART CARD HAVING MULTIPLE PAYMENT INSTRUMENTS

CROSS REFERENCE TO PRIOR APPLICATIONS

The present application claims priority under 35 U.S.C. § 119 to Korean Patent Application No. 10-2013-0015994 (filed on Feb. 14, 2013), which is hereby incorporated by reference in its entirety.

The subject matter of this application is related to U.S. patent application Ser. No. 13/949,657 filed Jul. 24, 2013, U.S. patent application Ser. No. 14/184,957 filed Feb. 20, 2014, U.S. patent application Ser. No. 14/167,272 filed Jan. 29, 2014, U.S. patent application Ser. No. 14/180,843 filed Feb. 14, 2014, and U.S. patent application Ser. No. 14/161,934 filed Jan. 23, 2014, the teachings of which are incorporated herein their entirety by reference.

BACKGROUND

The present disclosure relates to controlling data stored in a smart card and, more particularly, to setting one of multiple payment instruments stored in a smart card as a primary payment instrument with single user operation. A contactless smart card is any pocket-sized card embedded with an integrated circuit (IC) chip capable of storing various types of digital information. Such smart card may be referred to as a chip card or an IC card. The smart card contains more information than a typical magnetic stripe card and can be programmed for different types of applications. Some cards contain programming and data to support multiple applications and some might be updated to add new applications after they are issued. Such a smart card may be referred to as a combi smart card. In general, the combi smart card includes a magnetic band, a contact IC, and a contactless chip on boards (COB) with a radio frequency (RF) antenna. The combi smart card may interact with a corresponding user terminal through the magnetic band or the contact IC in a contact interaction manner or through the contactless COB in a contactless interaction manner. Due to many advantages thereof, the combi smart card has been popularly used as a contactless payment card or a contact payment card, such as a credit card, a debit card, an identification card, an automated teller machine (ATM) card, and a payment card for public transportation.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, information stored in a smart card may be controlled through single user input.

In accordance with still another aspect of the present invention, a smart card may store a plurality of payment instruments and select one of the payment instruments as a primary payment instrument in response to single user operation made through a user equipment.

In accordance with yet another aspect of the present invention, one of payment instruments stored in a smart card may be selected and set as a primary payment instrument through single user input.

In accordance with yet another aspect of the present invention, one of payment instruments stored in a smart card may be selected and set as a primary payment instrument through a tapping operating or a tagging operation made with user equipment.

In accordance with yet another aspect of the present invention, a primary payment instrument of a smart card may be changed to one of other payment instruments stored in the smart card through single user operation made through user equipment.

In accordance with at least one embodiment, a method may be provided for setting one of stored payment instruments as a primary payment instrument by a smart card. The method may include receiving a control signal from a user equipment, changing a current primary payment instrument with one of other payment instruments stored in the smart card in response to the control signal, and setting the changed payment instrument as a new primary payment instrument.

The receiving may include receiving the control signal with an application identification number (AID) and activating an applet matched with the received application identification number (AID) in the control signal. The activating may include activating an applet configured to change priorities of payment instruments stored in the smart card.

The changing a current primary payment instrument may include assigning a lowest priority to the current primary payment instrument and increasing priorities of the other payment instruments by one. The setting may include selecting a payment instrument having the highest priority and setting the selected payment instrument as the new primary payment instrument.

The method may further include transmitting information on a payment instrument having a highest priority upon receipt of a payment request. The user equipment may be configured to transmit the control signal when the user equipment detects the smart card in a predetermined distance through near field communication.

In accordance with at least one embodiment, a method may be provided for controlling a primary payment instrument of a smart card. The method may include receiving a control signal from a user equipment, changing priorities of payment instruments stored in the smart card in response to the control signal, and setting a payment instrument having a highest priority as a primary payment instrument.

The receiving may include receiving the control signal with an application identification number (AID) and initiating at least one applet configured to change the priorities of the stored payment instruments based on the received application identification number (AID) in the control signal. The at least one applet may be activated by performing a function "SELECT (AID)" based on the received application identification number.

The changing may be performed by executing at least one applet based on an application identification number (AID) included in the received control signal. The priorities of the payment instruments may be changed by perform a function "UPDATE DATA( )". The changing may include assigning a lowest priority to the current primary payment instrument and increasing priorities of the other payment instruments by one.

The changing may include initiating a setup applet based on an application identification number (AID) included in the receiving control signal, selecting a management applet based on a pre-registered application identification number (AID), activating the selected management applet, and changing the priorities of the payment instruments.

The changing priorities may include determining a desired payment instrument based on information on a user selected payment instrument included in the control signal, checking whether the desired payment instrument is stored in the smart card, assigning a highest priority to a payment instrument corresponding to the desired payment instrument, otherwise, transmitting an error message.

In accordance with at least one embodiment, a smart card may include an input/output circuit, a memory, and a processor. The input/output circuit may be configured to receive a control signal from a user equipment when the user equipment is located within a predetermined distance from the smart card. The memory may be configured to store a plurality of payment instruments each assigned with a priority, a setup applet, and a management applet. The processor may be configured to change priorities of payment instruments stored in the smart card in response to the control signal and to set a payment instrument having a highest priority as a primary payment instrument.

The processor may be configured to initiate the setup applet based on an application identification number (AID) included in the receiving control signal by executing a function of "SELECT (AID)" with a pre-registered application identification number (AID), activate the management applet as a result of the execution of the function, and change the priorities of the payment instruments as a result of the activating the management applet. The smart card may be at least one of a plastic card having an integrated circuit chip and a universal subscriber identity module (USIM) card included in user equipment.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
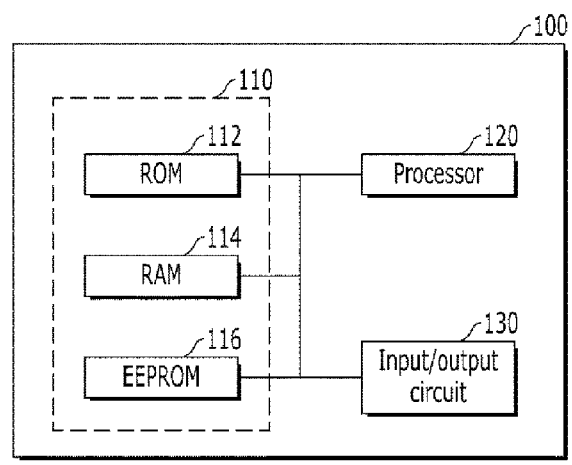
FIG. 1 illustrates a smart card in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, information stored in a smart card may be controlled through single operation of user equipment. Particularly, a plurality of payment instruments may be stored in a smart card. One of the payment instruments stored in the smart card may be selected and set as a primary payment instrument in response to single user interaction made through user equipment. Such a primary payment instrument of a smart card may be changed to one of other payment instruments stored in the smart card through single operation of user equipment without requiring further user input or user interaction. Hereinafter, overall configuration of a smart card and operation of controlling information stored in the smart card will be described with reference to FIG. 1 and FIG. 2. For convenience and ease of understanding, payment instruments stored in a smart card will be described as being controlled through single operation of user equipment. However, the present invention is not limited thereto. For example, the present invention may be applied to managing and controlling any types of data stored in a smart card.

FIG. 1 illustrates a smart card in accordance with at least one embodiment.

Referring to FIG. 1, smart card 100 stores multiple payment instruments in accordance with at least one embodiment. One of multiple payment instruments may be set as a primary payment instrument. Smart card 100 provides information on the primary payment instrument to a payment terminal of a merchant in response to a payment request. Such smart card 100 includes memory 110, processor 120, and input/output circuit 130.

Memory 110 may be data storage of smart card 100. Memory 110 may store information necessary for operating smart card 100 and performing certain operations requested by a use in connection with user equipment. Such information may include operating system programs, various types of application software (e.g., app or applet), information, and data produced as a result of performing operations. Furthermore, memory 110 may store a plurality of payment instruments each assigned with an identification number and/or a priority. Such a plurality of payment instruments may be fetched based on the identification number and managed by a corresponding applet (e.g., payment instrument applet). When a payment instrument applet is initiated or activated, the payment instrument applet provides information on a payment instrument in response to the control of processor 120.

Memory 110 may include read only memory (ROM) 112, random access memory (RAM) 114, and electrically erasable programmable (EEPROM) 116, but the present invention is not limited thereto. ROM 112 may store operation system codes of smart card 100. RAM 114 may be used as a stack or a buffer for storing data produced by operating system codes. EEPROM 116 may be configured to store data and various types of application software (e.g., applets, Apps). For example, EEPROM 116 stores a plurality of payment instruments, supported by smart card 100, and applet codes for setting one of the payment instruments as a primary payment instrument.

Processor 120 may control overall operation of smart card 100 in connection with user equipment. Particularly, processor 120 may perform operations necessary for driving the constituent elements of smart card 100 in response to the generation of predetermined events. Processor 120 may execute apps or applets stored in memory 110 and process data as a result of the execution of apps or applets upon the generation of a predetermined event.

In accordance with at least one embodiment, processor 120 may perform operations related to controlling and managing information stored in memory 110 upon the generation of predetermined events. Particularly, processor 120 may perform operations for setting one of stored payment instruments as a primary payment instrument in response to a user selection made through corresponding user equipment or changing a current primary payment instrument with one of other payment instruments upon the generation of single user operation made through the user equipment. Such operation of processor 120 will be described in detail with reference to FIG. 3 and FIG. 4.

Input/output circuit 130 is configured to communicate with other entity such as user equipment (e.g., user equipment 200 in FIG. 2) or a payment terminal of a merchant. The user equipment may include a smart phone, a mobile device, a cellular phone, a payment terminal, and so forth. For example, input/output circuit 130 performs radio frequency (RF) communication with user equipment 200. Furthermore, input/output circuit 130 performs near field communication (NFC) between smart card 100 and user equipment 200. Particularly, input/output circuit 130 may detect user equipment 200 when user equipment 200 is located in a predetermined distance and receive signal from user equipment 200. That is, when a user taps user equipment 200 with smart card 100 or taps smart card 100 with user equipment 200, smart card 100 detects user equipment 200. Such detection might invoke smart card 100 to establish a communication link to user equipment 200 instantly and temporally and receive a signal from user equipment 200 through a communication link.

Particularly, in response to the detected such tapping signal, input/output circuit 130 initiates a predetermined agent (e.g., applet) for setting one of payment instruments stored in smart card 100 as a primary payment instrument if the detected tapping signal is a signal initiating the predetermined agent. Furthermore, in response to the detected tapping signal, input/output circuit 130 may transmit information on a primary payment instrument under control of processor 120 if the tagging or tapping signal is a payment request signal which is generated during a mobile payment procedure.

In addition, the detected signal may be a signal selecting a particular payment instrument. In this case, the detected signal may include information on the selected particular payment instrument, such as an application identification number (AID) or an index thereof. For example, user equipment may receive a user input for selecting a particular payment instrument through a graphic user interface produced by a predetermined application installed in and executed in the user equipment.

The present invention is not limited to the configuration shown in FIG. 1. The present invention may be applied to various types of smart cards. For example, the present invention may be applied to a plastic payment card having an integrated circuit (IC) chip or a USIM card attached at a smart phone (e.g., user equipment).

Smart card 100 detects the user equipment (e.g., user equipment 200 of FIG. 2) when the user equipment is located near to smart card 100 and receive a control signal from the user equipment. In response to the control signal, smart card 100 selects one of stored payment instruments and set the selected payment instrument as a primary payment instrument in accordance with at least one embodiment. Such operation will be briefly described with reference to FIG. 2.

Figure 2:
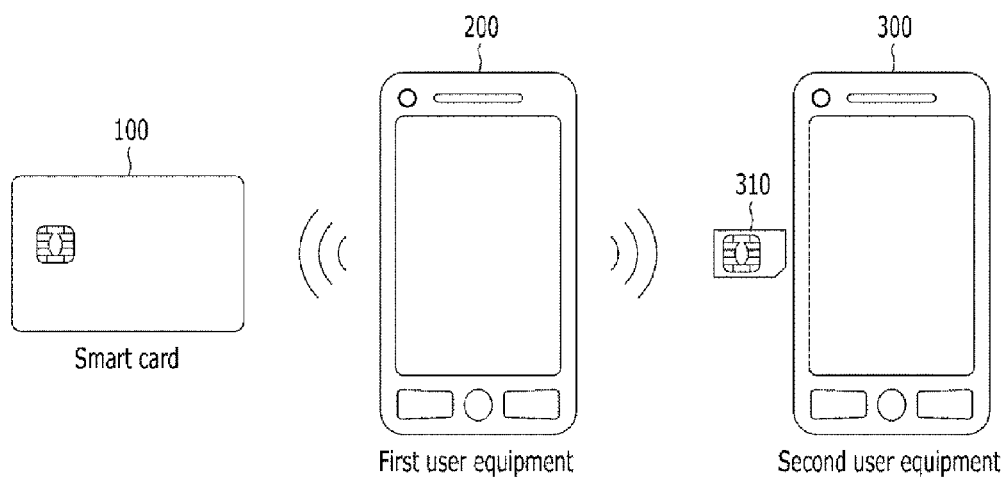
FIG. 2 illustrates managing and controlling information stored in a smart card through single user operation in accordance with at least one embodiment.

FIG. 2 illustrates managing and controlling information stored in a smart card through single user operation in accordance with at least one embodiment.

Referring to FIG. 2, a user may be able to set up one of payment instruments stored in smart card 100, as a primary payment instrument, by perform one simple operation with user equipment 200 in accordance with at least one embodiment. Particularly, a primary payment instrument (e.g., a payment instrument with the highest priority) of smart card 100 may be switched to a payment instrument with the second highest priority) when a user makes a tapping operation on smart card 100 with user equipment 200.

Smart card 100 may be implemented as a typical plastic card with a smart card chip, as shown in FIG. 1. The present invention, however, is not limited thereto. Smart card 100 may be implemented as USIM card 310 and installed in user equipment 300 as shown in FIG. 2. Universal Subscriber Identity Module (USIM) card 310 may include the same configuration of smart card 100. That is, USIM card 310 may a memory storing information on a plurality of payment instruments and a processor managing the stored information on a plurality of payment instruments. Such USIM card 310 may be configured to perform the same operation that smart card 100 performs.

In accordance with at least one embodiment, a user is able to set up a desired payment instrument as a primary payment instrument or to change a primary payment instrument of smart card 100 or a primary payment instrument of USIM card 310 with one of other stored payment instruments by a predetermined simple operation made using user equipment 200. For example, the predetermined simple operation may include tapping smart card 100 with user equipment 200 or tapping user equipment 300 having USIM card 310 with user equipment 200. That is, a user puts user equipment 200 near to smart card 100 or to user equipment 300 having USIM card 310. Such operation may be referred to as a tapping operation or a tagging operation.

User equipment 200 may be configured to transmit a predetermined control signal to smart card 100 or USIM card 310 when user equipment 200 detects smart card 100 or USIM card 310 is located in a predetermined distance. That is, user equipment 200 recognizes a tapping operation (e.g., tagging operation) made on smart card 100 or USIM card 310. Upon the recognition, user equipment 200 establishes a communication link to smart card 100 through near field communication and transmits a predetermined control signal through the communication link. For example, such a control signal may be a signal that invokes smart card 100 to switch a previously set primary payment instrument with one another payment instruments store din smart card 100.

In addition, user equipment 200 may be configured to generate a control signal with information on a desired payment instrument and to transmit the generated control signal to smart card 100 or USIM card 310 in accordance with at least one embodiment. For example, user equipment 200 may produce a graphic user interface by executing a predetermined application installed in user equipment 200 to enable a user for selecting or for entering information on a desired payment instrument, such as a Citibank credit card or a Visa credit card. User equipment 200 may receive a selection input and generate the control signal with information on the selected payment instrument. In this case, the control signal may include application identification (AID) or an index of the selected payment instrument. Such operation may be performed using a function "CHECK CARD".

As described, smart card 100 may be set with one of stored payment instruments as a primary payment instrument. In response to a payment request from at least one of user equipment 200 and a payment terminal (not shown), smart card 100 provides information on the primary payment instrument. In accordance with at least one embodiment, smart card 100 may change such a primary payment instrument with one of other payment instruments stored in smart card 100 in response to single operation made using user equipment 200. Such operation may be performed through executing applets and agents stored in memory 110 and executed by processor 120 of smart card 100. Hereinafter, such operation of each functional block in smart card 100 will be described in more detail with reference to FIG. 3. For convenience and ease of understanding, smart card 100 will be described as managing and controlling information stored therein by executing functional units such as applets and agents. However, the present invention is not limited thereto. Such functional units of smart card 100 may be implemented as hardware circuit in another embodiment of the present invention.

Figure 3:
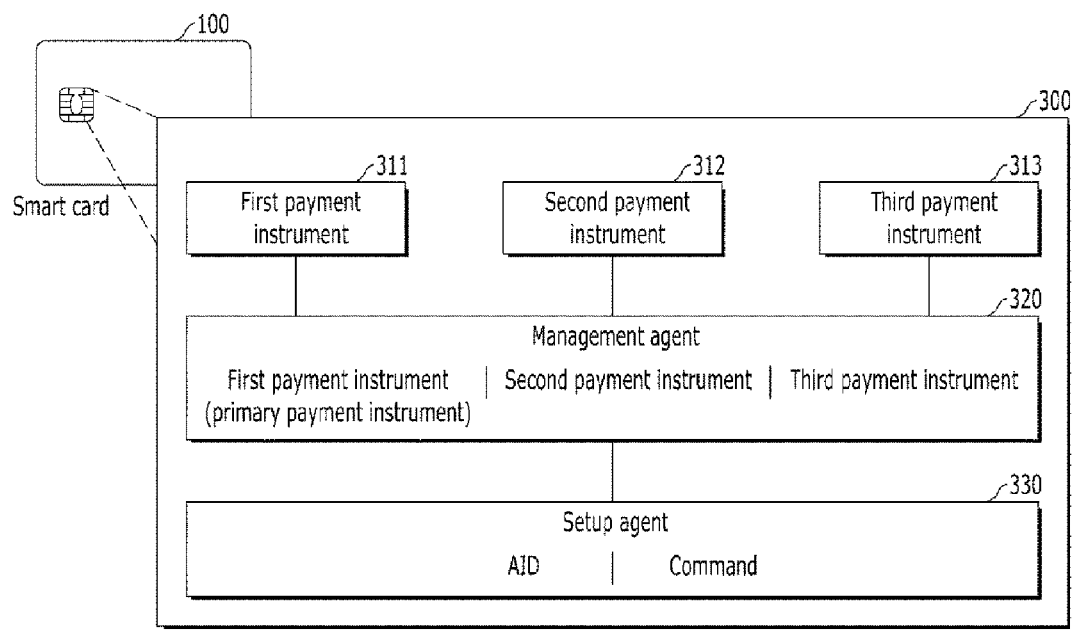
FIG. 3 illustrates functional configuration of a smart card in accordance with at least one embodiment.

FIG. 3 illustrates functional configuration of a smart card in accordance with at least one embodiment.

Referring to FIG. 3, functional configuration 300 of smart card 100 may include a plurality of payment instrument applets 311, 312, and 313, management agent 320, and setup agent 330. Such applets and agents may be applications (e.g., coding blocks) stored in memory 110 of smart card 100. Processor 120 executes each one of applets and agents to perform a dedicated task in response to a control signal received from other entity or a user.

Payment instrument applets 311, 312, and 313 may be an applet for controlling and managing associated payment instruments. For example, each one of payment instrument applets 311, 312, and 313 controls and manages information on an associated payment instrument. The payment instrument may include a credit card, a debit card, a prepaid card, a membership card, and so forth.

Payment instrument applets 311, 312, and 313 may provide information on an associated payment instrument to processor 120 in response to a predetermined control signal (e.g., when it is called). That is, payment instrument applets 311, 312, 313 may provide a name of a payment instrument, a payment instrument account number, an expiration date, a security code, and an associated payment processing server to a payment terminal through input/output circuit 130 under the control of processor 120. The payment terminal may perform a payment procedure with the provided payment instrument information for making a payment to purchase a good or a service from a merchant.

Each one of payment instrument applets 311, 312, and 313 may be assigned with a payment instrument identity of a corresponding payment instrument. Each one of payment instrument applets 311, 312, and 133 may be called by the payment instrument identity assigned thereto from processor 120, other applets, or agents such as management agent 320.

As shown in FIG. 3, smart card 100 is described as having three payment instrument applets, but the present invention is not limited thereto. The number of payment instrument applets may depend on the number of payment instruments stored in smart card 100. Accordingly, the number of payment instrument applets may vary based on the number payment instruments stored in smart card 100.

Management agent 320 may be application software or an applet for managing plurality of payment instruments stored in smart card 100. For example, management agent 320 manages information on a list of payment instrument identities, such as a payment instrument ID list. The payment instrument ID list may include information on payment instruments and associated payment instrument identities. Particularly, the payment instrument ID list includes payment instrument identities sorted in a predetermined order based on a priority assigned thereto. For example, a payment instrument ID associated with the highest priority is sorted as the first one of the payment instrument ID list and a payment instrument ID associated with the lowest priority is sorted as the last one of the payment instrument ID. That is, the payment instrument ID list includes payment instrument IDs arranged in a descending order, but the present invention is not limited thereto. In accordance with at least one embodiment, a payment instrument ID assigned with the highest priority is set as a primary payment instrument.

The payment instrument ID of each payment instrument may be application identification (AID). Such application identification (AID) of each payment instrument may be stored in a predetermined order according to a priority assigned thereto as the payment instrument ID list. For example, a primary payment instrument has application identification (ADI) assigned with the highest priority. That is, a payment instrument applet assigned with the highest priority manages the primary payment instrument.

When smart card 100 or USIM card 310 of third user equipment 300 receives a payment request signal from user equipment 200 or a payment terminal (not shown) through near field communication, management agent 320 identifies a payment instrument having the highest priority among the payment instrument ID list and drives a payment applet associated with the identified payment instrument to transmit information on the payment instrument to user equipment 200.

Setup agent 330 may be application software or an applet for changing (e.g., setting) a primary payment instrument in response to a control signal from user equipment 200. For example, setup agent 330 may be initiated upon the detection of single user operation made using user equipment 200. As described, user equipment 200 may support near field communication (NFC) and be detected when user equipment 200 is located near to smart card 100 or user equipment 300 having USIM card 310. That is, upon the generation of a taping operation or a tagging operation, setup agent 330 is initiated.

Upon the initiation, setup agent 330 initiates management agent 320 and controls management agent 320 to change priorities each assigned to a corresponding payment instrument. As described, the priorities are stored in the payment instrument ID list which is managed by management agent 320. In accordance with at least one embodiment, setup agent 330 may execute a function "SELECT ( )" to select and initiate management agent 320 upon the detection of the tapping operation of the tagging operation of user equipment 200. Then, setup agent 330 may invoke management agent 340 to perform a function "UPDATE DATA ( )" to update priorities of payment instruments.

In response to such control, management agent 320 may change priorities assigned to payment instruments to change the current primary payment instrument with one of other primary payment instruments. For example, management agent 320 may change the priority assigned to the current primary payment instrument to be the lowest priority and increase priorities of other payment instruments by one. As a result, a payment instrument assigned with the next highest priority becomes a payment instrument having the highest priority. That is, the current payment instrument is changed to a payment instrument having the next highest priority. Accordingly, smart card 100 changes a primary payment instrument sequentially according to a sorting order of priorities assigned to payment instruments upon the detection of the tapping operation or the tagging operation of user equipment 200. However, the present invention is not limited thereto.

After setting the payment instrument having the next highest priority as the new primary payment instrument, smart card 100 transmits information on the new primary payment instrument in response to a payment request from one of user equipment 200 and a payment terminal (not shown) in accordance with at least one embodiment.

As described, USIM card 310 included in user equipment may be configured to perform the same operation of smart card 100. That is, USIM card 310 may have the similar functional configuration of smart card 100. Accordingly, the detailed description thereof will be omitted herein.

As described, a user is able to change a primary payment instrument of smart card 100 by making single operation with user equipment 200. Hereinafter, operation for changing a primary payment instrument of smart card 100 will be described with reference to FIG. 4.

Figure 4:
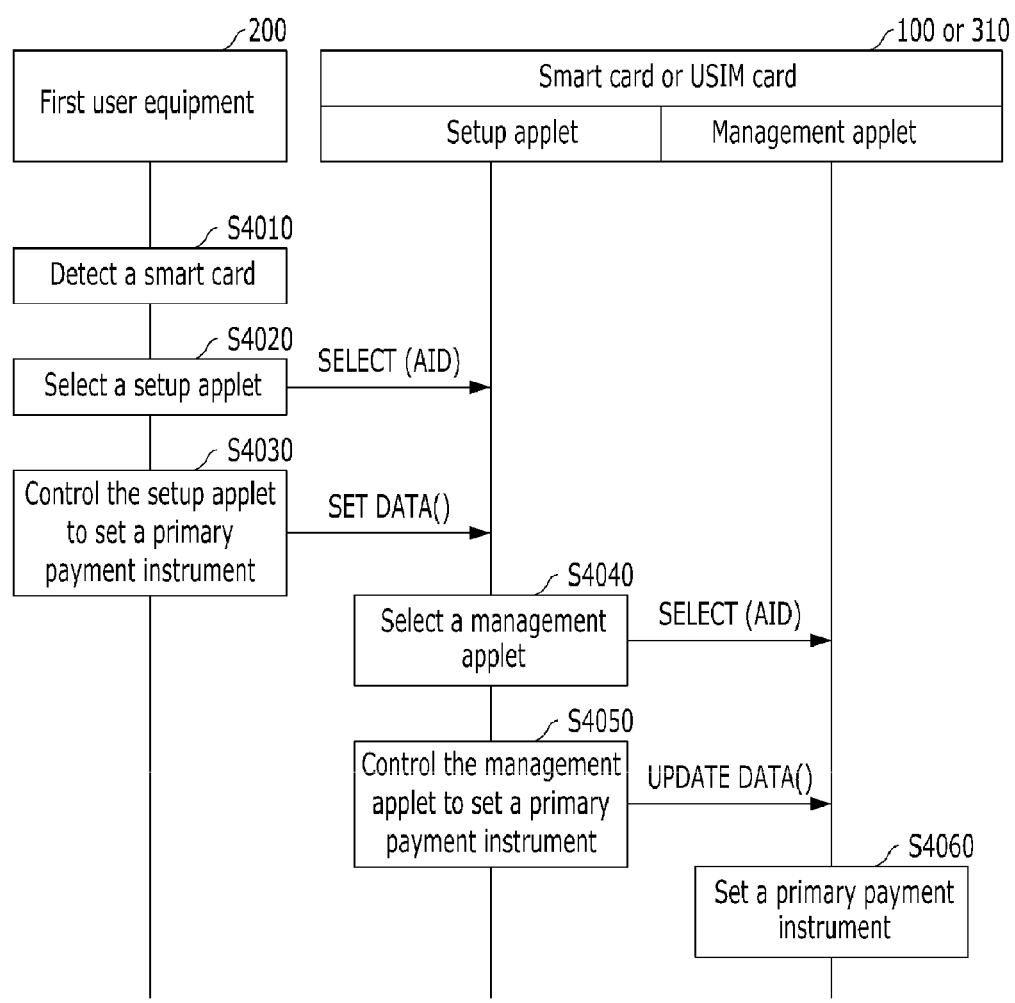
FIG. 4 illustrates a method of changing a primary payment instrument of a smart card through single user operation made through user equipment in accordance with at least one embodiment.

FIG. 4 illustrates a method of changing a primary payment instrument of a smart card through single user operation made through user equipment in accordance with at least one embodiment.

Referring to FIG. 4, smart card 100 may be detected at step S4010. For example, first user equipment 200 may detect smart card 100 located within a predetermined distance. Such detection may be initiated by a tapping operation made by an associated user using first user equipment 200. That is, when the user taps user equipment 200 on smart card 100 or when the user puts user equipment 200 on or over smart card 100 within a predetermine distance, first user equipment 200 detects smart card 100 through near field communication.

In accordance with at least one embodiment, first user equipment 200 may be installed with application software that detects a radio frequency (RF) tag signal from smart card 100 and initiates an operation for setting or changing a primary payment instrument stored in smart card 100. That is, first user equipment 200 controls smart card 100 to set a primary payment instrument with a desired payment instrument or to change a current primary payment instrument with one of other payment instruments stored in smart card 100 based on a predetermined scheme.

At step S4020, a selection signal is transmitted to smart card 100. For example, upon the detection of smart card 100, first user equipment 200 transmits a control signal to smart card 100 to select and to initiate setup applet 330. Particularly, first user equipment 200 may execute a function of "SELECT( )" to control smart card 100 to select and to initiate setup applet 330.

At step S4030, a setup command is transmitted to smart card 100. For example, first user equipment 200 transmits a setup command to smart card 100 to perform setting a new primary payment instrument. That is, first user equipment 200 may execute a function of "SET DATA( )" to control setup applet 330 to set a new primary payment instrument.

In accordance with another embodiment, a check card command may be transmitted to smart card 100. For example, when a user selects a desired payment instrument through user equipment 200, user equipment 200 may generate the check card command including information on the selected payment instrument and control smart card 100 to check whether smart card 100 stores the selected payment instrument. Such operation may be performed using a function "CHECK CARD" with application identification (AID) or an index of the selected payment instrument. In response such a check card command, smart card 100 or USIM card 310 may check the stored payment instrument based on the received information on the selected payment instrument. If the selected payment instrument is not stored therein, smart card 100 or USIM card 310 may transmit a signal indicating error. If the selected payment instrument is stored therein, a management applet may be initiated and assign the highest priority to the selected payment instrument.

At step S4040, a management applet is initiated. For example, in response to the setup command, setup applet 330 selects and initiates management applet 330 by previously registering applet identification (AID) of management applet 330. That is, in order to select management applet 330, the applet identification of management applet 330 may be previously registered. In accordance with at least one embodiment a function "REGISTER (AID, SET DATA( ))" may be used to previously register operations related to the function "SET DATA".

At step S4050, an update command is transmitted to management applet 320. For example, setup applet 330 executes a function "UPDATE DATA ( )" to control management applet 320 to select one of payment instrument applets for setting one of stored payment instruments a primary payment instrument or for changing a current primary payment instrument with one of other stored payment instruments.

At step S4060, a new payment instrument is selected and set as a primary payment instrument. For example, in response to the update command, management applet 330 performs the function "UPDATE DATA ( )" to increase a second highest priority to the highest priority. That is, management agent 320 may change the priority assigned to the current primary payment instrument to be the lowest priority and increase priorities of other payment instruments by one. As a result, a payment instrument assigned with the next highest priority becomes a payment instrument having the highest priority. That is, the current payment instrument is changed to a payment instrument having the next highest priority. Accordingly, smart card 100 selects a payment instrument based on the user selection of a desired payment instrument or changes a primary payment instrument sequentially according to a sorting order of priorities assigned to payment instruments upon the detection of the tapping operation or the tagging operation of user equipment 200.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for setting one of payment instruments stored in a smart card, as a primary payment instrument to make a payment, the method comprising:
    receiving, by the smart card, a control request from a user equipment physically separated from the smart card through a communication link established between the smart card and the user equipment, wherein the user equipment is one of a smart phone, cellular phone, a mobile device, a handheld computer, a laptop, a tablet personal computer (PC), a pad-like device, a personal digital assistant (PDA), a portable multimedia player (PMP), and a navigation device;
    changing, by the smart card, priorities assigned to payment instrument applets each representing a respective payment instrument by activating a predetermined applet stored in the smart card in response to the received control request; and
    setting, by the smart card based on the changed priority, one of the payment instrument applets as a primary payment instrument applet that provides information on an associated payment instrument to a payment terminal in response to a payment request.

2. The method of claim 1, wherein the receiving includes:
    receiving the control request with an application identification number (AID); and
    activating an applet stored in the smart card and matched with the received application identification number (AID) in the control request.

3. The method of claim 2, wherein the activating includes:
    activating a management applet stored in the smart card;
    changing, by the management applet, priorities assigned to payment instrument applets stored in the smart card.

4. The method of claim 1, wherein the changing includes:
    assigning a lowest priority to a current primary payment instrument applet; and
    increasing priorities of the other payment instrument applets by one.

5. The method of claim 1, wherein the setting includes:
    selecting a payment instrument applet assigned with the highest priority; and
    setting the selected payment instrument applet as the new primary payment instrument applet to provide information on an associated payment instrument to said payment terminal in response to a payment request.

6. The method of claim 1, comprising:
    fetching information on a payment instrument associated with the primary payment instrument applet having a highest priority upon receipt of a payment request; and
    transmitting the fetched information to a predetermined device to make a payment in response to the payment request.

7. The method of claim 1, wherein the user equipment is configured to transmit the control signal when the user equipment detects a single operation made on the smart card through near field communication.

8. A method for controlling, by a smart card, a plurality of payment instruments stored in the smart card, the method comprising:
  detecting, by the smart card, a control request generated by a user equipment physically separated from the smart card when the user equipment recognizes one of a tapping operation and a tagging operation made on the smart card, wherein the user equipment is one of a smart phone, cellular phone, a mobile device, a handheld computer, a laptop, a tablet personal computer (PC), a pad-like device, a personal digital assistant (PDA), a portable multimedia player (PMP), and a navigation device;
  activating, by the smart card, a predetermined applet in response to the detected control request;
  changing, by the activated predetermined applet stored in the smart card, priorities of payment instrument applets, stored in the smart card and each storing information on an associated payment instrument; and
  setting, by the smart card, a payment instrument applet having a highest priority as a primary payment instrument applet.

9. The method of claim 8, wherein the receiving includes:
  receiving the control request with an application identification number (AID); and
  initiating an applet stored in the smart card and matched with the AID in the control request.

10. The method of claim 9, wherein the applet is activated by performing a function "SELECT (AID)" based on the received AID in the control request.

11. The method of claim 8, wherein the changing comprises:
  executing at least one applet configured to change the priorities of the payment instrument applets in response to the activated predetermined applet.

12. The method of claim 11, wherein the priorities of the payment instrument applets are changed by perform a function "UPDATE DATA( )".

13. The method of claim 11, wherein the changing includes:
  assigning a lowest priority to a current primary payment instrument applet; and
  increasing priorities of the other payment instrument applets by one.

14. The method of claim 8, wherein the changing includes:
  determining a desired payment instrument based on information on a user selected payment instrument included in the control request;
  checking whether a payment instrument applet storing information on the desired payment instrument is stored in the smart card;
  assigning a highest priority to a payment instrument applet corresponding to the desired payment instrument;
  otherwise, transmitting an error message.

15. The method of claim 8, wherein the changing includes:
  initiating a setup applet based on an application identification number (AID) included in the receiving control request;
  selecting, by the setup applet, a management applet based on a pre-registered application identification number (AID);
  activating the selected management applet; and
  changing, by the management applet, the priorities of the payment instrument applets.

16. The method of claim 8, comprising:
  transmitting information on a payment instrument associated with the primary payment instrument applet upon receipt of a payment request.

17. The method of claim 8, wherein the user equipment is configured to recognize one of the tapping operation and the tagging operation and generate the control request when the user equipment detects the smart card in a predetermined distance through near field communication.

18. A smart card comprising:
  an input/output circuit configured to receive a control request from a user equipment physically separated from the smart card when the user equipment detects a predetermined single operation made on the smart card, wherein the user equipment is one of a smart phone, cellular phone, a mobile device, a handheld computer, a laptop, a tablet personal computer (PC), a pad-like device, a personal digital assistant (PDA), a portable multimedia player (PMP), and a navigation device;
  a memory configured to store a plurality of payment instrument applets each assigned with a priority and information on an associated payment instrument, a setup applet, and a management applet; and
  a processor configured to activate at least one of the setup applet and the management applet in order to change the assigned priority of at least one payment instrument applet stored in the smart card in response to the control request and to set a payment instrument applet having a highest priority as a primary payment instrument applet.

19. The smart card of claim 18, wherein the processor is configured to:
  initiate the setup applet based on an application identification number (AID) included in the receiving control request by executing a function of "SELECT (AID)" with a pre-registered application identification number (AID);
  activate the management applet as a result of the execution of the function; and
  change the priorities of the payment instrument applets as a result of the activating the management applet.

20. The smart card of claim 18, wherein the smart card is at least one of a plastic card having an integrated circuit chip and a universal subscriber identity module (USIM) card included in user equipment.

* * * * *